(12) United States Patent
Grieb et al.

(10) Patent No.: US 9,809,084 B2
(45) Date of Patent: Nov. 7, 2017

(54) HOUSING PARTICULARLY FOR A MOTOR VEHICLE HVAC SYSTEM

(71) Applicant: Behr GmbH & Co. KG, Stuttgart (DE)

(72) Inventors: Andreas Grieb, Stuttgart (DE); Rainer Buerkle, Fellbach (DE); Thomas Feith, Korntal-Muenchingen (DE)

(73) Assignee: MAHLE International GmbH, Stuttgart (DE)

( * ) Notice: Subject to any disclaimer, the term of this patent is extended or adjusted under 35 U.S.C. 154(b) by 970 days.

(21) Appl. No.: 13/720,626

(22) Filed: Dec. 19, 2012

(65) Prior Publication Data

US 2013/0156499 A1 Jun. 20, 2013

(30) Foreign Application Priority Data

Dec. 19, 2011 (DE) .......................... 10 2011 089 092

(51) Int. Cl.
| | |
|---|---|
| B25G 3/00 | (2006.01) |
| F16B 21/18 | (2006.01) |
| F16D 1/00 | (2006.01) |
| B60H 1/00 | (2006.01) |
| F24F 13/20 | (2006.01) |

(52) U.S. Cl.
CPC ......... B60H 1/00528 (2013.01); F24F 13/20 (2013.01); Y10T 403/7073 (2015.01)

(58) Field of Classification Search
CPC ...... B60H 1/00528; F24F 13/20; F16B 12/00; Y02T 10/88; Y02T 403/7073
USPC ............... 403/265, 266, 344, 345, 375, 381; 52/592.1
See application file for complete search history.

(56) References Cited

U.S. PATENT DOCUMENTS

| | | | | |
|---|---|---|---|---|
| 2,269,927 | A | * | 1/1942 | Crooks .................... E04F 15/04 52/390 |
| 4,095,913 | A | * | 6/1978 | Pettersson ............. E04B 1/6125 217/96 |
| 4,664,551 | A | * | 5/1987 | Poitier ........................... 403/335 |
| 4,723,789 | A | * | 2/1988 | Schmidt .................... A63C 5/02 156/268 |
| 5,165,816 | A | * | 11/1992 | Parasin ..................... E04C 2/10 403/334 |
| 5,182,892 | A | * | 2/1993 | Chase ..................... E04F 15/04 52/533 |

(Continued)

FOREIGN PATENT DOCUMENTS

| | | |
|---|---|---|
| CH | 676627 A5 | 2/1991 |
| DE | 44 25 362 A1 | 1/1995 |

(Continued)

*Primary Examiner* — Abigail Troy
*Assistant Examiner* — Nahid Amiri
(74) *Attorney, Agent, or Firm* — Muncy, Geissler, Olds & Lowe, P.C.

(57) ABSTRACT

A housing is provided for a motor vehicle HVAC system, which is formed from interconnectable housing parts and has a groove, delimited by a first and a second groove leg, on a first housing part and a tongue on a second housing part and in which to connect the housing parts the tongue is disposed in the groove. In this regard, the first and second groove legs are formed in such a way that in the inserted state of the tongue in the groove at least one groove leg at its free end is spaced apart from a corresponding tongue-side bearing shoulder of the second housing part.

8 Claims, 8 Drawing Sheets

(56) References Cited

U.S. PATENT DOCUMENTS

| | | | |
|---|---|---|---|
| 6,021,753 A * | 2/2000 | Chaffin | B29C 65/04 123/184.21 |
| 6,385,984 B2 * | 5/2002 | Aoki | B60H 1/00528 277/642 |
| 6,526,719 B2 * | 3/2003 | Pletzer et al. | 52/592.2 |
| 6,808,777 B2 * | 10/2004 | Andersson | E04F 15/02 403/345 |
| 7,036,825 B2 | 5/2006 | Pettitt et al. | |
| 7,174,873 B2 * | 2/2007 | Uematsu | B29C 65/02 123/184.61 |
| 7,270,102 B2 * | 9/2007 | Tanikawa | B29C 65/06 123/184.42 |
| 7,607,888 B2 | 10/2009 | Hori et al. | |
| 7,722,280 B2 * | 5/2010 | Hofmann | B60G 7/001 280/124.116 |
| 8,117,795 B2 * | 2/2012 | Knauseder | 52/592.2 |
| 8,375,673 B2 * | 2/2013 | Evjen | 52/592.1 |
| 8,869,485 B2 * | 10/2014 | Pervan | 52/582.1 |
| 9,278,604 B2 * | 3/2016 | Chikagawa | B60H 1/00528 |
| 2011/0017742 A1 * | 1/2011 | Sausen et al. | 220/324 |
| 2012/0247717 A1 * | 10/2012 | Chikagawa et al. | 165/42 |

FOREIGN PATENT DOCUMENTS

| | | |
|---|---|---|
| DE | 94 20 291 U1 | 10/1995 |
| DE | 199 43 278 A1 | 3/2001 |
| DE | 10 2006 052 732 A1 | 5/2007 |
| DE | 10 2007 048 826 A1 | 4/2009 |
| EP | 0 414 946 B1 | 11/1992 |
| EP | 0 761 984 A1 | 3/1997 |
| EP | 1 510 380 B1 | 10/2007 |
| EP | 2 284 027 A2 | 2/2011 |
| FR | 2 787 746 A1 | 6/2000 |
| JP | 2004-330968 A | 11/2004 |
| JP | WO 2011152267 A1 * | 12/2011 ......... B60H 1/00528 |
| WO | WO 2006/034861 A1 | 4/2006 |
| WO | WO 2011152267 A1 * | 12/2011 |

* cited by examiner

HOUSING PARTICULARLY FOR A MOTOR VEHICLE HVAC SYSTEM

This nonprovisional application claims priority under 35 U.S.C. §119(a) to German Patent Application No. DE 10 2011 089 092.0, which was filed in Germany on Dec. 19, 2011, and which is herein incorporated by reference.

BACKGROUND OF THE INVENTION

Field of the Invention

The invention relates to a housing for a motor vehicle HVAC system.

Description of the Background Art

HVAC systems for motor vehicles (such as, for example, passenger cars and commercial vehicles) are injection molded from plastic. The HVAC system housings are made as thin-walled hollow bodies. Because undercuts can be realized only conditionally in the plastic injection molding process, the housings are made of a number of parts, which are then assembled. In addition, components such as heat exchangers and flaps must be installed in the HVAC device, which would be possible only to a limited extent in a closed housing.

One-piece sealing systems in the form of a tongue-and-groove geometry are used in each case to seal the housing parts from one another. In other words, no additional material is used for the sealing.

This type of tongue-and-groove joint 10 known from the prior art, which connects housing parts 2, 3 of a housing 1 together, is illustrated in FIG. 1.

A groove-shaped geometry (groove) 20 is made in one housing part 2 and a tongue-shaped geometry (tongue) 30 in another housing part 3. This tongue-and-groove geometry 10 has in addition the task of being an installation aid, so that housing parts 2, 3 can be positioned readily and with an accurate fit to one another and assembled. The fixation of housing parts 2, 3 then occurs with metal clips or screws (not shown).

Groove 20 comprises two groove legs 40, 50, whereby groove leg 40 is disposed on the side of groove 20, said side facing housing interior 100, and groove leg 50 on the side of groove 20, said side facing housing exterior 200. In the inserted state of tongue 30 in groove 20 as shown in FIG. 1, the groove-side shoulders 41, 51 each lie on the corresponding tongue-side shoulders 31, 32. In FIG. 1, tongue 30 lies in the groove interior with its tongue flanks 35, 36.

The sealing principle of the tongue-and-groove joint 10 is primarily the supporting of the shoulder surfaces of the inner groove-side shoulder 41 and the outer groove-side shoulder 51. A labyrinth due to a tongue-and-groove joint 10 has a further but secondary sealing effect.

In the tongue-and-groove joint 10 illustrated in FIG. 1, both groove shoulders 41, 51 should be supported. This is rarely the case, however, because of fabrication tolerances. The sealing direction is the direction labeled Z. A direction perpendicular to the sealing direction Z is labeled X. The total width of the tongue-and-groove joint in this example is 5 mm, and the total height of the tongue-and-groove joint is 7.3 mm.

In this regard, the total width of tongue-and-groove joint 10 between side 33, facing housing interior 100, of tongue-side shoulder 31 and side 34, facing housing exterior 200, of tongue-side shoulder 32 is measured. The total height of tongue-and-groove joint 10 between side 26, facing away from tongue 30, of groove base 25 and side 37, facing away from groove 20, of tongue-side shoulder 32 is measured.

The groove legs (groove shoulders) 40, 50 are each 1.2 mm thick at the end. The bevel on the inner sides of both groove legs 40, 50 relative to the Z-direction is 2° in each case. The groove depth is 4.6 mm. The wall thickness of the housing wall, extending below tongue 30, of the tongue-side housing part is 1.8 mm. The tongue width is 2.4 mm at the bottom. The tongue height is 4.2 mm. The angle on the inner tongue side, i.e., the angle between the Z-direction and the inner tongue flank 35, and the angle on the outer tongue side, i.e., the angle between the Z-direction and tongue flank 36, are each also 2°. The distance between groove 20 and tongue 30 per side, i.e., the distance between one of the groove legs 40, 50 and tongue 30 is 0.1 mm in each case. Typically, wall thicknesses of the housing walls of 1.8 mm are used.

It is disadvantageous in the tongue-and-groove joints from the prior art that due to the fabrication tolerances in plastic injection-molded parts, primarily due to warping and shrinkage, the groove shoulder surfaces are not supported continuously. Often only a groove shoulder (groove flank) is supported, and the groove shoulder with support changes, for example, from outside to inside. Because air can flow transversely in the area of the tongue-and-groove joint, it exits in other areas. In part, there is also no contact at all of the groove-side shoulders to the tongue-side shoulders. Here air exits directly. This air leakage reduces the air output, which is available for climatizing the vehicle interior.

Furthermore, elastic tongue-and-groove systems, which comprise either an elastic tongue or an elastic groove, are known from the prior art. Systems with elastic tongues are described in the documents EP 1 510 380 B1 (which corresponds to U.S. Pat. No. 7,036,825), EP 0 414 946 B1, and DE 199 43 278 A1. Systems with an elastic groove are described in the documents DE 44 25 362 A1 and EP 2 284 27 A2. It is a disadvantage in such elastic tongue-and-groove systems that they have a lower elasticity in the region of radii. As a result, fabrication tolerances can no longer be compensated, which leads to increased leakage. Basically, elastic deformation also leads to higher assembly forces.

Tongue-and-groove systems with at least one undercut at the groove are also known from the prior art. Such tongue-and-groove systems are described, for example, in the documents DE 94 20 291 U1 and EP 2 284 27 A2. A disadvantage in such tongue-and-groove systems is that the assembly force is considerably increased. In addition, the production of the undercuts is associated with additional manufacturing costs.

SUMMARY OF THE INVENTION

It is therefore an object of the invention to provide a housing, formed from interconnected housing parts, particularly for an HVAC system, in which the tongue-and-groove joint between the housing parts assures a secure and reliable connection and sealing even during deformations.

According to an embodiment, a housing, particularly for a motor vehicle HVAC system, is provided, which is formed from interconnectable housing parts and has a groove, delimited by a first and a second groove leg, on a first housing part and a tongue on a second housing part. In this case, to connect the housing parts, the tongue is disposed in the groove. According to the invention, the first and second groove legs are formed in such a way that in the inserted state of the tongue in the groove at least one groove leg at its free end is spaced apart from a corresponding tongue-side bearing shoulder of the second housing part.

According to an embodiment of the invention, thus a housing is provided particularly for the HVAC system of a motor vehicle, which has a geometry improved in regard to possible air leakage or an alternative geometry for sealing the housing parts with consideration of fabrication tolerances and assembly requirements. The reduction of a possible air leakage makes a substantial contribution to increasing the energy efficiency of an HVAC system (HVAC device) provided with a housing of the invention. As a result, the gasoline consumption and the $CO_2$ emissions of a motor vehicle with such an HVAC system are greatly reduced.

In a variant of the invention, an improvement of the conventional tongue-and-groove joint, known from the prior art, is achieved by the setting back of a groove shoulder. In particular, in this regard the outer groove shoulder is shortened, because here molding flashes caused by tools often occur, which may result in leaks and acoustic events such as squeaking and creaking.

As a result of the shortening of the groove shoulder, the molding flash no longer comes into contact with the support on the tongue side. The inner groove shoulder can also be shortened according to the invention. Advantageous in this case is the realization of a better force flow from the upper to the lower housing part during joining by screws, metal clamps, or local welding points.

The setting back of a groove shoulder assures that during warping of the housing walls only the one groove shoulder is supported, whereby it is also avoided that the support changes between the inside and outside. In the tongue-and-groove joint of the invention with a set-back groove shoulder, the main sealing direction, as in the tongue-and-groove joint shown in FIG. 1, is the direction in which the tongue is to be inserted in the groove for connecting the housing parts (Z-direction).

In an embodiment of the invention, at least the groove leg, which in the inserted state of the tongue in the groove lies on the corresponding tongue-side shoulder of the second housing part, is rounded at its free end.

In another embodiment of the invention, the extensions of the groove leg sides, facing the groove interior, and the extensions of the two tongue flanks on which the tongue in the inserted state of the tongue in the groove lies on the groove leg inner surface, form acute angles, particularly different acute angles. Preferably, the sealing direction in which the tongue is to be inserted into the groove to connect the housing parts forms different acute angles with the extensions of the groove leg sides facing the groove interior. In particular, the sealing direction in which the tongue is to be inserted into the groove to connect the housing parts forms different acute angles with the extensions of the two tongue flanks.

In another embodiment of the invention, the first and/or second groove leg is/are formed tapered at its (their) free end. In particular, the first or second groove leg is made thinner than the second or first groove leg.

In an embodiment of the invention, for example, the inner groove shoulder is set back, so that only the outer groove shoulder is supported. In this embodiment of the invention, particularly the outer groove shoulder is rounded so that the linear support is assured.

In addition, the molding flashes are shifted away from the contact site to the corresponding tongue-side shoulder toward the end of the radius. This shifting of the molding flashes entails considerable acoustic advantages in regard to creaking.

Further, the acute angle on the tongue and in the groove can be increased in comparison with the tongue-and-groove joint shown in FIG. 1. As a result, more play is assured during the assembly of the housing parts and thereby also an easier finding of the parts.

According to the invention, the groove-side and the tongue-side housing parts are matched to the requirements of injection molding technology particularly in that no wall thickness transitions and no material accumulations occur, when differences in wall thickness then reduce the wall thickness toward the end of the part.

In this variant of the invention, the sealing direction is also the Z-direction.

In another especially preferred variant of the invention, the distance of the outer groove leg to the outer tongue-side shoulder is reduced to zero. An overlapping between the inner groove leg and the tongue is achieved by the use of corresponding different acute angles on the tongue and in the groove. In this regard, the inner groove leg is made thinner and thereby also softer than the outer groove leg. Further, the inner groove shoulder is set back so that only the outer groove shoulder is supported. In this case as well, the outer groove shoulder is rounded so that linear support is assured. Molding flashes from the contact site to the corresponding tongue-side shoulder are also shifted toward the end of the radius, as a result of which acoustic advantages are achieved in regard to creaking here as well.

In this variant of the invention, the course of the wall thickness is realized via the groove with small changes in wall thickness, particularly via the outer groove leg for support on the corresponding tongue-side shoulder and further via the housing wall under the tongue. A stiff connection between the housing parts is achieved as a result. The introduction of force by screws or metal clamps is assured across this region. Thus, a division of the tongue-and-groove joint of the invention into an elastic area with a thin wall thickness inside and a stiff region with a greater wall thickness outside is achieved.

Further, in this variant of the invention, the acute angle on the tongue and in the groove at the outer groove leg is increased compared with the tongue-and-groove joint shown in FIG. 1. As a result, more play is achieved during the assembly of the housing parts and thereby also an easier finding of the parts.

Contrary to the tongue-and-groove joint shown in FIG. 1, in this case there are two main sealing directions perpendicular to one another. A first main sealing direction runs along the Z-direction, as in the tongue-and-groove joint shown in FIG. 1. The other main sealing direction runs along the connection line, perpendicular to the first main sealing direction, between the groove legs and thus also along a direction labeled X in FIG. 1.

In the housing of the invention, the tongue and the groove are particularly designed in such a way that the tongue tip in the inserted state of the tongue in the groove lies on the groove base.

In another especially preferred variant of the invention, for example, both groove shoulders can be set back, so that the support at the tongue tip occurs in the groove bottom (groove base). It is advantageous here that the rounded shape of the tongue tip also promotes a linear contact in the case of warped walls. The radius of the groove bottom does not apply here; the groove base is formed in particular by a flat area. In addition, the freely hanging groove legs have the opportunity to come into contact with the tongue at the flanks, which results in additional sealing.

The main sealing direction here also runs along the Z-direction. Depending on the warping, a second secondary sealing direction can also exist here, which runs along the X-direction.

Furthermore, according to the invention a housing particularly for a motor vehicle HVAC system is provided, which is formed from interconnectable housing parts and comprises a groove, delimited by a first and a second groove leg, on a first housing part and a tongue on a second housing part. Further, to connect the housing parts the tongue is disposed in the groove and the first groove leg in the inserted state of the tongue in the groove lies on a corresponding tongue-side bearing shoulder of the second housing part. According to the invention, the tongue is disposed on the second housing part in such a way and the tongue-side housing wall has such a geometry that the second groove leg, which is longer than the first groove leg, in the inserted state of the tongue in the groove lies on a corresponding bearing surface of the tongue-side housing wall of the second housing part.

The tongue-side housing wall of the second housing part in the region of its bearing surface for the second groove leg can be formed with a predetermined oversize compared with the second groove leg in the region of the area of its contact with the supporting surface.

In particular, the tongue-side housing wall forms a predetermined angle with a sealing direction, in which to connect the housing parts the tongue is to be inserted in the groove, and/or the second groove leg is formed tapering toward its free end, for example, tapering gradually.

The second groove leg can be formed in such a way that the second groove leg in the inserted state of the tongue in the groove follows the geometry of the tongue-side housing wall with the predetermined oversize.

Stated differently, in another especially preferred variant of the invention, the housing is provided with a groove, which has, for example, a longer, elastic inner groove leg. Except that the elastic groove leg is stiffened in radii, this tongue-and-groove joint of the invention has two equivalent sealing directions, namely, the shoulder support in the Z-direction and the elastic groove leg in the X-direction. Because here both sealing directions are equivalent and do not impede each other in their function, a possible leakage is reduced to a great extent here.

In addition, this variant of the invention allows warping of the housing walls without an increase in leakage. If the housing walls fall inwardly, the outer groove shoulder tends to lift off. To this end, the contact between the inner elastic groove leg and the housing wall strengthens. If the housing walls fall outwardly, the inner elastic groove leg can lift off the housing wall, whereby, however, the contact between the shoulder of the outer groove leg and the corresponding tongue-side shoulder is strengthened.

Thus, any possible warping is compensated by the two sealing directions running perpendicular to one another. The geometries of the groove and the tongue on the outer side (the side facing the housing exterior) can correlate to the corresponding geometries of the groove and the tongue, which were described in the previously explained variants of the invention.

The geometries of the groove and the tongue on the inner side (on the side facing the housing interior) behave similarly in the upper region up to about half of the tongue height. From here, the wall thickness of the inner groove leg tapers until the inner groove leg at the end reaches a predetermined thickness.

The inner groove leg is longer than the outer groove leg. The transition at the inner groove leg to the tapering can be made as a step or also continuously until the predetermined thickness at the end is reached. The inner shoulder is omitted on the tongue side. The housing wall on the inner tongue side runs at a predetermined angle to the Z-direction.

Between the end of the inner groove leg and the inner wall of the tongue side, a predetermined oversize is provided in the design configuration.

A further realization of this variant of the invention provides for a parallel design of the contact region between the inner groove leg and the inside wall of the tongue side (tongue-side housing part). The inside wall of the tongue side in this case follows the geometry of the inner groove leg with a predetermined oversize. The groove leg is thereby nearly parallel to the Z-direction, i.e., apart from the minimally necessary drafts.

The parallel design (shaping) achieves that the inner groove leg nonetheless remains in contact with the tongue side and continues to seal also in the presence of a shift along the Z-direction of the groove side (groove-side housing part) to the tongue side (tongue-side housing part).

According to the invention, furthermore, a housing particularly for a motor vehicle HVAC system is provided, which is formed from at least two interconnectable housing parts and has a groove-like profile, which is delimited by a first and a second leg and is created in a contact region, provided for connecting the housing parts, of a first housing part of the two housing parts. According to the invention, a second housing part of the two housing parts has an L-shaped profile in its contact regions provided for connecting the two housing parts. In this case, the first leg of the groove-like profile is formed shorter than the second leg of the groove-like profile, and in the connected state of the two housing parts, the two legs of the groove-like profile at their free ends each lie on the same leg of the L-shaped profile of the second housing part.

In particular, the leg of the L-shaped profile of the second housing part, on which the legs of the groove-like profile lie in the inserted state of the tongue in the groove, at its free end has a recess formed in such a way that the second leg of the groove-like profile of the first housing part in the connected state of the two housing parts overlaps the second housing part in the region of the recess.

In other words, in an advantageous variant of the invention, the elastic leg of a housing part is rotated by 90° to reduce the previously mentioned stiffening of elastic legs in radii. Thus, the elastic leg lies perpendicular to the assembly direction. In this variant of the invention, the sealing direction is the Z-direction, which runs along the assembly direction. Warping can be compensated by the oversize of the elastic leg with an opposing housing part.

In this variant of the invention, the system of the tongue-and-groove joint is virtually not used. The lower housing part is made as a simple L-profile in the region of the contact site. The upper housing half is also L-shaped in its basic form. Nevertheless, the L-profile tapers in the middle from the bottom up, so that a predetermined wall thickness results. The recess of the L-profile of the upper housing part can be angular in shape or rounded. With extension of the housing wall, the upper housing part is in contact with the lower housing part. At the end of the L-shaped design, the upper housing part overlaps the lower housing part within a predefined region.

In particular, a predetermined oversize of at least a component is used in the tongue-and-groove joint of the invention. Improvement of the sealing capability of the tongue-and-groove joint of the invention can be achieved, for example, by inserting sealing elements in the tongue-and-groove system, or also by gluing on, gluing together, or welding of the tongue-and-groove joint.

According to the invention, without an increase in the assembly cost a number of geometries compensating for fabrication tolerances are provided for housing sealing with a reduction of the air leakage.

According to the invention, further, a motor vehicle HVAC system with a housing of the invention is provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 2:
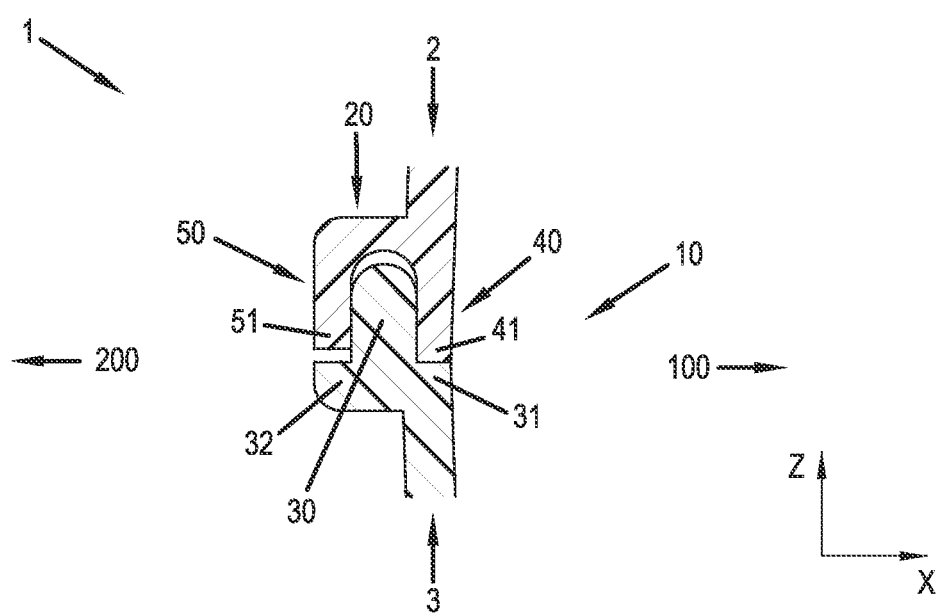
FIG. 2 is a cross section of a tongue-and-groove joint in the inserted state of a tongue in a groove according to an embodiment of the invention.

Two housing parts 2, 3 of a housing 1 of a motor vehicle HVAC system (not shown) are illustrated in FIG. 2. Housing parts 2, 3 are connected to one another by means of a tongue-and-groove joint 10. FIG. 2 shows a cross section of tongue-and-groove joint 10 in the inserted state of a tongue 30 in a groove 20 according to a first embodiment of the invention. Groove 20 is made in housing part 2 and tongue 30 in the other housing part 3. Groove 20 comprises two groove legs 40, 50, whereby groove leg 40 is on the side of groove 20, said side facing housing interior 100, and groove leg 50 is disposed on the side of groove 20, said side facing the housing exterior 200.

In a tongue-and-groove joint 10, illustrated in FIG. 2, in the inserted state of tongue 30 in groove 20, only shoulder 41 of inner groove leg 40 lies on the tongue-side shoulder 31 of housing part 3. Outer groove leg 50 is shorter than inner groove leg 40 and has a set-back shoulder 51, which does not lie on the corresponding tongue-side shoulder 32.

The sealing direction of tongue-and-groove joint 10 illustrated in FIG. 2 is the direction labeled Z. A direction perpendicular to the sealing direction Z is labeled X.

Figure 3:
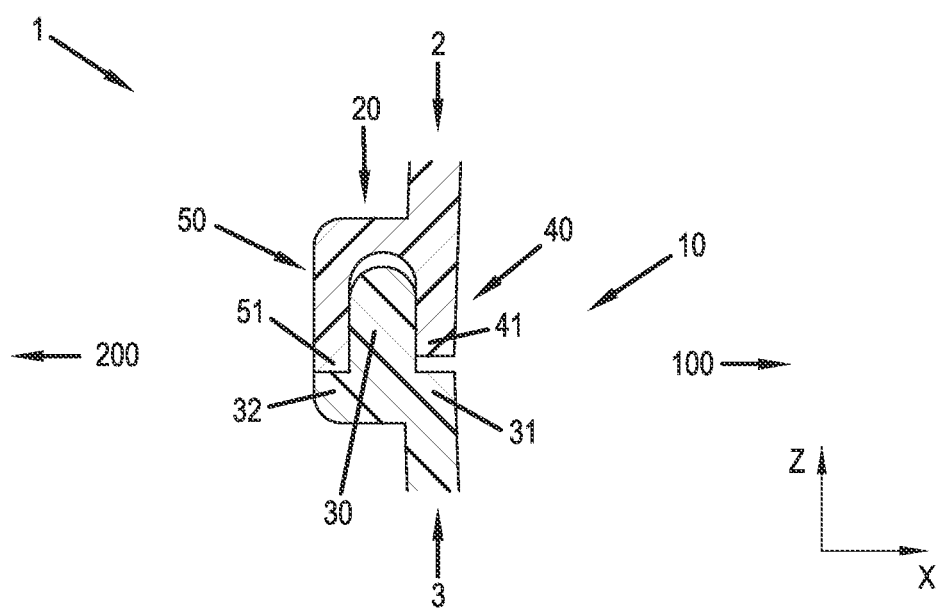
FIG. 3 is a cross section of a tongue-and-groove joint in the inserted state of a tongue in a groove according to an embodiment of the invention.

FIG. 3 shows a cross section of a tongue-and-groove joint 10 in the inserted state of a tongue 30 in groove 20 according to a second embodiment of the invention. In tongue-and-groove joint 10, illustrated in FIG. 3, in the inserted state of tongue 30 in groove 20, only shoulder 51 of outer groove leg 50 lies on the tongue-side shoulder 32 of housing part 3. Inner groove leg 40 is shorter than outer groove leg 50 and has a set-back shoulder 41, which is spaced from the corresponding tongue-side shoulder 31.

Figure 1:
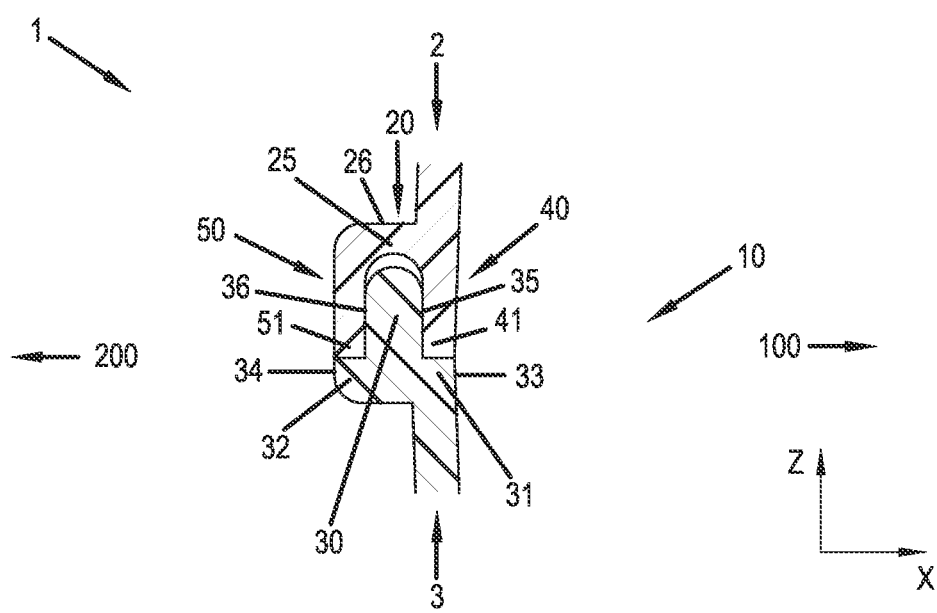
FIG. 1 is a cross section of a prior-art tongue-and-groove joint in an inserted state of a tongue in a groove.

The dimensions of the tongue-and-groove joints 10, illustrated in FIGS. 2 and 3, can generally correspond to the dimensions of the tongue-and-groove joint illustrated in FIG. 1. The exception is the set-back groove-side shoulder 41 or 51. The distance between a set-back shoulder 41 or 51 and the corresponding tongue-side shoulder 31 or 32 can be, for example, between 0.2 and 0.8 mm, ideally 0.5 mm.

The sealing direction of tongue-and-groove joint 10 illustrated in FIG. 3 is the direction labeled Z.

Figure 4:
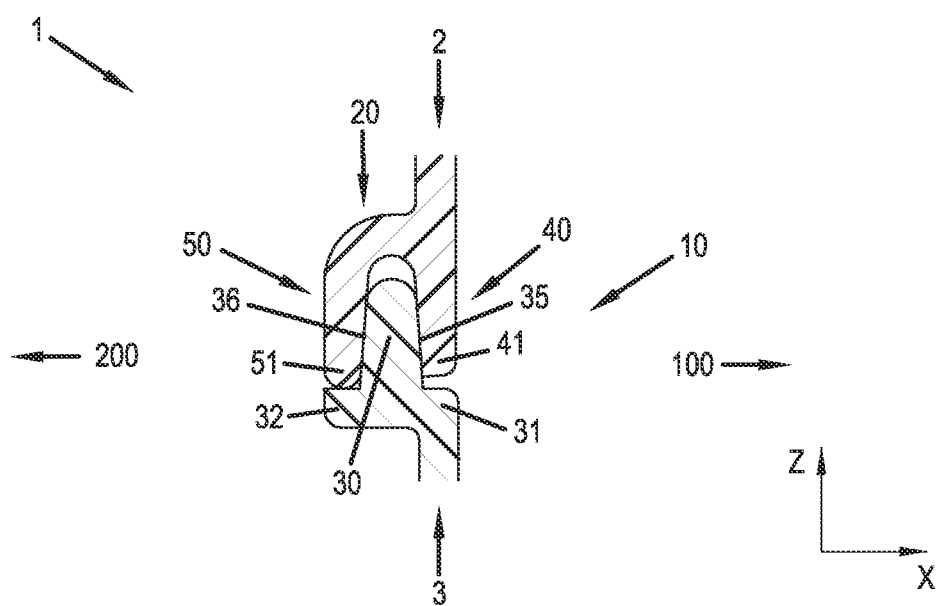
FIG. 4 is a cross section of a tongue-and-groove joint in the inserted state of a tongue in a groove according to an embodiment of the invention.

FIG. 4 shows a cross section of a tongue-and-groove joint 10 in the inserted state of a tongue 30 in groove 20 according to a third embodiment of the invention. In tongue-and-groove joint 10, illustrated in FIG. 4, in the inserted state of tongue 30 in groove 20, only the rounded shoulder 51 of outer groove leg 50 lies on the tongue-side shoulder 32 of housing part 3. Inner groove leg 40 is shorter than outer groove leg 50 and has a set-back shoulder 41, which does not lie on the corresponding tongue-side shoulder 31. The angles on tongue 30 and in groove 20, i.e., the angle formed by the extensions of tongue flanks 35, 36 or by the extensions of the groove leg sides (groove leg inner sides) facing the groove interior, are in each case larger than in the groove-and-tongue joined illustrated in FIG. 1.

The sealing direction of tongue-and-groove joint 10 illustrated in FIG. 4 is the direction labeled Z.

The dimensions and particularly the total width and the total thickness of tongue-and-groove joint 10 illustrated in FIG. 4 correspond to the dimensions of the tongue-and-groove joint illustrated in FIG. 1. Here the total width of tongue-and-groove joint 10 is between 4.3 and 5 mm, ideally 4.5 mm. The total height of tongue-and-groove joint 10 is between 7 and 8 mm, ideally 7.3 mm.

The inner and outer groove legs 50 at their end can each have a thickness between 1.0 and 1.4 mm, ideally 1.1 mm. The bevel on the groove leg sides, facing the groove interior, of groove legs 40, 50 in each case can be between 3° and 7°, ideally 5°. The groove depth is between 4.3 and 5.3 mm, ideally 4.6 mm.

On tongue side 3, the wall thickness below tongue 30 is between 1.1 and 1.8 mm, ideally 1.3 mm. The tongue width in the lower region of tongue 30 can be between 2.0 and 2.4 mm, ideally 2.2 mm. The tongue height can be between 3.9 and 4.9 mm, ideally 4.2 mm. The angle on the tongue inner side or tongue outer side, i.e., the angle between the Z-direction and tongue flank 35, facing housing interior 100, or between the Z-direction and flank side 36, facing housing exterior 200, can be between 3° and 7, ideally 5°. The distance between groove legs 40, 50 and tongue 30 in each case can be between 0 and 0.1 mm, ideally 0.05 mm.

The distance between the inner groove-side shoulder 41 and the corresponding tongue-side shoulder 31 can be between 0.2 and 0.8 mm, ideally 0.5 mm.

The wall thickness of the housing walls can be typically between 1.4 and 1.8 mm, ideally 1.4 mm.

Figure 5:
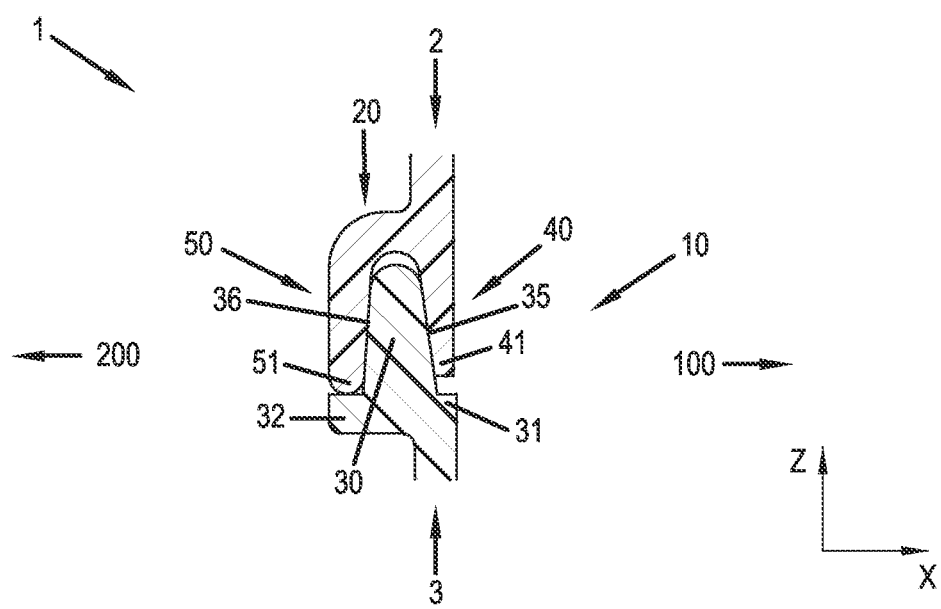
FIG. 5 is a cross section of a tongue-and-groove joint in the inserted state of a tongue in a groove according to an embodiment of the invention.

FIG. 5 shows a cross section of a tongue-and-groove joint 10 in the inserted state of a tongue 30 in groove 20 according to a fourth embodiment of the invention. In tongue-and-groove joint 10, illustrated in FIG. 4, in the inserted state of tongue 30 in groove 20, again only rounded shoulder 51 of outer groove leg 50 lies on the tongue-side shoulder 32 of housing part 3. Inner groove leg 40 is shorter than outer groove leg 50 and has a set-back shoulder 41, which does not lie on the corresponding tongue-side shoulder 31. Moreover, inner groove leg 40 is made thinner and therefore softer than outer groove leg 50.

In this case, the distance of outer groove leg 50 to tongue 30 is reduced to zero. An overlapping between inner groove leg 40 and tongue 30 is achieved by the presence of different angles on tongue 30 and in groove 20. The angle on the tongue and in the groove on outer groove leg 50, i.e., the angle formed by the Z-direction and tongue flank 36, facing housing exterior 200, or by the Z-direction and the inner side of outer groove leg 50, is increased from 2° to 5° compared with the corresponding angle of tongue-and-groove joint illustrated in FIG. 1.

The sealing directions of tongue-and-groove joint 10 illustrated in FIG. 5 are the directions labeled Z or X.

The dimensions, such as particularly the total width and the total thickness of tongue-and-groove joint 10 illustrated in FIG. 5, correspond to the dimensions of the tongue-and-groove joint illustrated in FIG. 1. In this regard, the total width of tongue-and-groove joint 10 is between 4.3 and 5 mm, ideally 4.5 mm. The total height of tongue-and-groove joint 10 is between 7 and 8 mm, ideally 7.3 mm.

In the tongue-and-groove joint illustrated in FIG. 5, the thickness of inner groove leg 40 at its free end is between 0.6 and 1.1 mm, ideally 0.8 mm. The thickness of outer groove leg 50 is between 1.0 and 1.4 mm, ideally 1.1 mm.

The bevel on the groove leg inner sides of groove legs 40, 50 in each case can be between 3° and 7°, ideally 5°. The groove depth is between 4.3 and 5.3 mm, ideally 4.6 mm.

The wall thickness of the housing wall of tongue-side housing 3, which extends below tongue 30, can be between 1.1 and 1.8 mm, ideally 1.3 mm. The tongue width in the lower region of tongue 30 can be between 2.2 and 2.6 mm, ideally 2.4 mm. The tongue height can be between 3.9 and 4.9 mm, ideally 4.2 mm. The angle on the outer side of tongue 30, i.e., the angle between the Z-direction and tongue flank 36 facing housing exterior 200, can be between 3° and 7°, ideally 5°. The angle on the inner side of tongue 30, i.e., the angle between the Z-direction and tongue flank 35 facing housing interior 100, can be between 6° and 10°, ideally 8°.

The distance between outer groove leg 50 and tongue 30 in each case can be between 0 and 0.1 mm, ideally 0 mm. The distance between shoulder 41 of the inner groove leg 40 and the corresponding tongue-side shoulder 31 can be between 0.2 and 0.8 mm, ideally 0.5 mm.

The wall thickness of the housing walls can be typically between 1.4 and 1.8 mm, ideally 1.4 mm.

Figure 6:
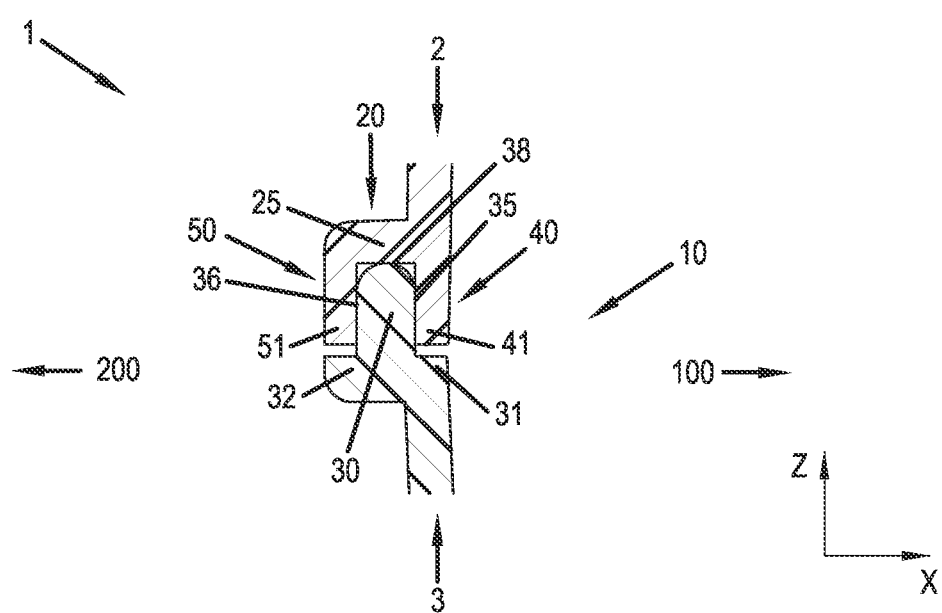
FIG. 6 is a cross section of a tongue-and-groove joint in the inserted state of a tongue in a groove according to an embodiment of the invention.

FIG. 6 shows a cross section of a tongue-and-groove joint 10 in the inserted state of a tongue 30 in groove 20 according to a fifth embodiment of the invention. In tongue-and-groove joint 10 illustrated in FIG. 6, both shoulders 41, 51 of groove leg 40, 50 are set back, so that in the inserted state of tongue 30 in groove 20 tongue 30 is supported at its rounded tongue tip 31 in groove bottom (groove base) 26. Groove base 28 is made flat in this case. The freely hanging groove legs 40, 50 have the possibility of coming into contact with tongue 30 at tongue flanks 35, 36, which results in additional sealing.

The main sealing direction of tongue-and-groove joint 10 runs along the Z-direction. Depending on the warping, tongue-and-groove joint 10 may have a second secondary sealing direction running in the X-direction.

The dimensions of tongue-and-groove joint 10, illustrated in FIG. 6, can generally correspond to the dimensions of the tongue-and-groove joint illustrated in FIG. 1 or 4. The exceptions in this case are the raising of tongue 30 by 0.4 mm and the elimination of the radius in groove base 26. In addition, the distance between the two groove-side shoulders 41, 51 and the corresponding tongue-side bearing shoulders 31, 32 is between 0.2 and 0.8 mm, ideally 0.5 mm.

Figure 7:
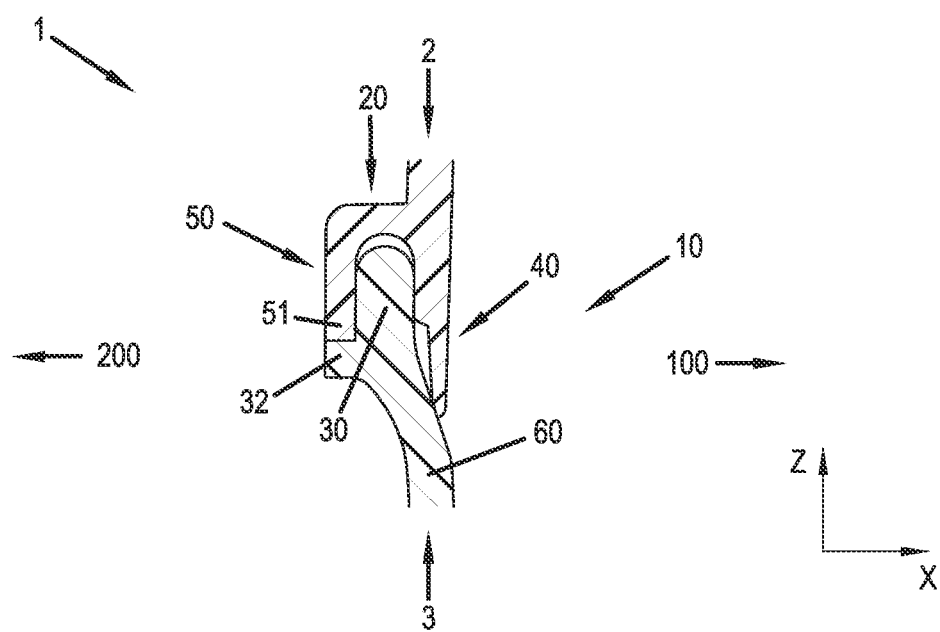
FIG. 7 is a cross section of a tongue-and-groove joint in the inserted state of a tongue in a groove according to an embodiment of the invention.

FIG. 7 shows a cross section of a tongue-and-groove joint 10 in the inserted state of a tongue 30 in groove 20 according to a sixth embodiment of the invention. In tongue-and-groove joint 10, which is illustrated in FIG. 7 and is shown in the inserted state of tongue 30 in groove 20, outer groove leg 50 lies on outer tongue-side shoulder 32 of housing part 3. Tongue 30 is disposed on tongue-side housing part 3 in such a way that there is no tongue-side bearing shoulder 31 corresponding to inner groove leg 40. In this case, housing wall 60 of tongue-side housing part 3 has a geometry such that in the inserted state of tongue 30 in groove 20 inner groove leg 40, which is longer than outer groove leg 50, lies on housing wall 60 of tongue-side housing part 3. Inner groove leg 40 in this embodiment of the invention is formed as an elastic groove leg.

The dimensions of tongue-and-groove joint 10 illustrated in FIG. 7 on the outer side can correspond in general to the corresponding dimensions of a tongue-and-groove joint illustrated in FIG. 2, 3, 4, or 5. The geometries of groove 20 and tongue 30 behave similarly on the inner side in the upper region up to about half the tongue height. Starting here, the wall thickness of inner groove leg 40 tapers until inner groove leg 40 at the end reaches a thickness of especially 0.4 to 0.8 mm, ideally of 0.5.

Inner groove leg 40 is particularly 2 to 6 mm, ideally 4 mm longer than the outer groove leg 50. The transition at inner groove leg 40 in the tapering can be made as a step or gradually until the previously mentioned thickness at the end is reached. The inner shoulder is omitted on tongue-side housing part 3. Housing wall 60 on the tongue inner side runs at an angle to the Z-direction, which is particularly between 10° and 30°, ideally 20°.

In the design configuration an oversize, which is particularly between 0.05 and 0.2 mm, ideally 0.1 mm, is provided between the end of inner groove leg 40 and the inner wall of tongue-side housing part 3, i.e., between the end of inner groove leg 40 and the side, facing housing interior 100, of the housing wall of tongue-side housing part 3.

In the sixth embodiment of the invention, in particular a parallel design of the contact region between inner groove leg 40 and inner wall 60 of tongue side 3 is provided. Inner wall 60 of tongue-side housing part 3 thereby follows the geometry of inner groove leg 40 with an oversize, which is particularly between 0.05 and 0.3 mm, ideally 0.15 mm. Inner groove leg 40 in this case is almost parallel to the Z-direction, i.e., apart from the minimally necessary drafts.

This tongue-and-groove joint of the invention has two equivalent sealing directions, namely, the groove shoulder support in the Z-direction and the elastic groove leg in the X-direction.

Figure 8:
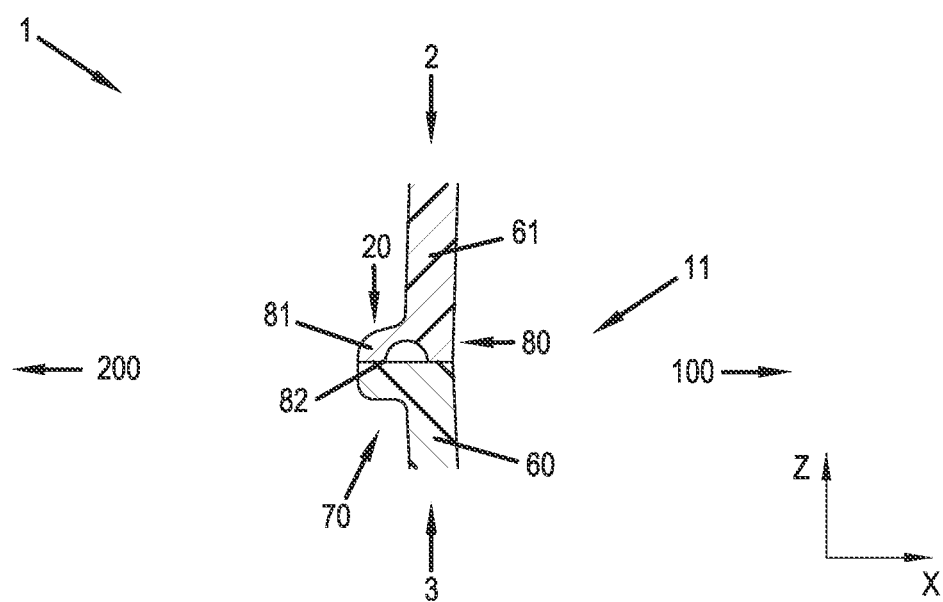
FIG. 8 is a cross section of a mechanical joint to connect two housing parts in the connected state of the housing parts according to a seventh embodiment of the invention.

FIG. 8 shows a cross section of a mechanical joint to connect two housing parts 2, 3 of a housing 1 in the connected state of housing parts 2, 3 according to a seventh embodiment of the invention.

In the seventh embodiment of the invention, the system of the tongue-and-groove joint is not used. The lower housing part 3 in the region of the contact site is made as a simple L-profile 70. The wall thickness of L-profile 70 can be between 1.2 and 1.8 mm, ideally 1.4 mm.

The upper housing half 2 basically also comprises an L-profile 80. Nevertheless, the L-profile 80 tapers in the middle from the bottom up, so that an elastic leg 81 with a wall thickness results, which is particularly between 0.4 and 1.0 mm, ideally 0.7 mm. The recess of L-profile 80 of upper housing part 2 can be angular in shape or rounded. The L-profile 80, tapered in the middle from the bottom up, of upper housing part 2 in this case has a groove-like geometry and forms a groove-like profile 20 of upper housing part 2.

In the extension of housing walls 60, 61, upper housing part 2 is in contact with lower housing part 3. At the end of the L-shaped design 80 and within a predetermined range 82, upper housing part 2 overlaps lower housing part 3 particularly between 0.05 and 0.3 mm, ideally by 0.15.

Warping can be compensated by the oversize of elastic leg 81 compared with lower housing part 3. The sealing direction here is the Z-direction.

In all previously described embodiments of the invention, the given dimensions of the components are by way of example. The use of other, not explicitly indicated dimensions of the components is conceivable in all described embodiments of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A housing for a motor vehicle HVAC system, the housing comprising:
   interconnectable housing parts; and
   a groove delimited by a first and a second groove leg on a first housing part and a tongue on a second housing part,
   wherein, to connect the housing parts, the tongue is disposed in the groove and
   wherein the first groove leg in the fully inserted state of the tongue in the groove lies on a corresponding tongue-side bearing shoulder of the second housing part,
   wherein the tongue is disposed on the second housing part such that the tongue-side housing wall has a geometry such that the second groove leg, which is formed longer than the first groove leg, in the fully inserted state of the tongue in the groove, lies on a corresponding bearing surface of the tongue-side housing wall of the second housing part,
   wherein a tip of the tongue, in the fully inserted state of the tongue in the groove, is spaced apart from a base of the groove, and
   wherein the second groove leg has a free end and the second groove leg tapers toward the free end, such that the second groove leg narrows towards the free end.

2. The housing according to claim 1, wherein the tongue-side housing wall of the second housing part in the region of the bearing surface for the second groove leg has a predetermined oversize compared with the second groove leg in the region of the second groove leg that contacts the bearing surface.

3. The housing according to claim 1, wherein the tongue-side housing wall forms a predetermined angle with a sealing direction, in which to connect the housing parts the tongue is to be inserted in the groove.

4. The housing according to claim 1, wherein the second groove leg is formed such that the second groove leg in the inserted state of the tongue in the groove follows the geometry of the tongue-side housing wall.

5. The housing according to claim 1, wherein the tongue extends perpendicular from the tongue-side bearing shoulder.

6. The housing according to claim 1, wherein second housing part includes a single tongue-side bearing shoulder.

7. The housing according to claim 1, wherein the second groove leg extends past the tongue-side bearing shoulder.

8. The housing according to claim 1, wherein the first groove leg directly contacts the tongue-side bearing shoulder.

* * * * *

UNITED STATES PATENT AND TRADEMARK OFFICE
CERTIFICATE OF CORRECTION

PATENT NO. : 9,809,084 B2
APPLICATION NO. : 13/720626
DATED : November 7, 2017
INVENTOR(S) : Grieb et al.

It is certified that error appears in the above-identified patent and that said Letters Patent is hereby corrected as shown below:

On the Title Page

Item (71) should read:
(71) Applicant: MAHLE International GmbH, Stuttgart (DE)

Signed and Sealed this
Twentieth Day of February, 2018

Andrei Iancu
*Director of the United States Patent and Trademark Office*